(12) United States Patent
Rinker

(10) Patent No.: US 9,163,192 B2
(45) Date of Patent: Oct. 20, 2015

(54) COAL PROCESSING WITH ADDED BIOMASS AND VOLATILE CONTROL

(75) Inventor: Franklin G. Rinker, Marco Island, FL (US)

(73) Assignee: C2O Technologies, LLC, Marco Island, FL (US)

( * ) Notice: Subject to any disclaimer, the term of this patent is extended or adjusted under 35 U.S.C. 154(b) by 880 days.

(21) Appl. No.: 13/234,781

(22) Filed: Sep. 16, 2011

(65) Prior Publication Data

US 2012/0066967 A1    Mar. 22, 2012

Related U.S. Application Data

(60) Provisional application No. 61/383,552, filed on Sep. 16, 2010.

(51) Int. Cl.
*C10L 5/02* (2006.01)
*C10L 5/00* (2006.01)
*C10L 9/08* (2006.01)
*C10B 49/02* (2006.01)
*C10B 53/04* (2006.01)
*C10B 57/00* (2006.01)
*C10B 57/08* (2006.01)
(Continued)

(52) U.S. Cl.
CPC .................. *C10L 9/083* (2013.01); *C10B 49/02* (2013.01); *C10B 53/04* (2013.01); *C10B 57/005* (2013.01); *C10B 57/08* (2013.01); *C10B 57/10* (2013.01); *C10G 1/02* (2013.01); *C10K 1/003* (2013.01); *C10L 5/16* (2013.01); *C10L 5/361* (2013.01); *C10G 2300/1011* (2013.01); *C10G 2300/202* (2013.01); *Y02E 50/10* (2013.01); *Y02E 50/15* (2013.01); *Y02E 50/30* (2013.01)

(58) Field of Classification Search
CPC ...... C10B 49/02; C10B 53/04; C10B 57/005; C10B 57/08; C10B 57/10; C10G 1/02; C10G 2300/1011; C10G 2300/202; C10K 1/003; C10L 5/16; C10L 5/361; C10L 9/083; Y02E 50/10; Y02E 50/15; Y02E 50/30
USPC ..................................... 44/591, 621, 622, 629
See application file for complete search history.

(56) References Cited

U.S. PATENT DOCUMENTS

| 1,814,980 A | 7/1931 | Wessel |
| 1,976,908 A | 10/1934 | Wittenberg |

(Continued)

OTHER PUBLICATIONS

International Search Report, Application No. PCT/US2012/039598, Dated Dec. 28, 2012.

(Continued)

*Primary Examiner* — James Goloboy
*Assistant Examiner* — Latosha Hines
(74) *Attorney, Agent, or Firm* — MacMillan, Sobanski & Todd, LLC

(57) ABSTRACT

A process for treating input coal includes treating input coal in a pyrolysis step to form coal char. The pyrolysis step includes heating the coal substantially in the absence of oxygen to remove volatile material from the coal. The volatile material evolved from the coal in the pyrolysis step is treated to separate the volatile material into gases and liquids, wherein the liquids contain condensed volatile material. A portion of the liquids is directed to the coal char, and the returned portion of the liquids is mixed with the coal char, thereby returning some of the volatile material to the coal char.

19 Claims, 1 Drawing Sheet

(51) Int. Cl.

| C10B 57/10 | (2006.01) |
|---|---|
| C10K 1/00 | (2006.01) |
| C10L 5/16 | (2006.01) |
| C10L 5/36 | (2006.01) |
| C10G 1/02 | (2006.01) |

(56) References Cited

U.S. PATENT DOCUMENTS

| 2,029,883 | A |  | 2/1936 | MacCubbin et al. |
| 2,040,100 | A |  | 5/1936 | Miller |
| 2,044,764 | A |  | 6/1936 | Bywater |
| 2,260,072 | A |  | 10/1941 | Wilton |
| 2,366,900 | A |  | 1/1945 | Weir |
| 2,528,553 | A |  | 11/1950 | Royster |
| 2,666,796 | A |  | 1/1954 | Gorin et al. |
| 2,693,409 | A |  | 11/1954 | Stephens, Jr. |
| 2,748,063 | A |  | 5/1956 | Radasch |
| 2,774,716 | A |  | 12/1956 | Kulik |
| 3,010,893 | A |  | 11/1961 | Kulik |
| 3,375,175 | A |  | 3/1968 | Eddinger et al. |
| 3,463,310 | A |  | 8/1969 | Ergun et al. |
| 3,574,065 | A |  | 4/1971 | Eddinger et al. |
| 3,585,732 | A |  | 6/1971 | Itahashi |
| 3,736,233 | A |  | 5/1973 | Sass et al. |
| 3,938,966 | A |  | 2/1976 | Kindig et al. |
| 4,028,219 | A |  | 6/1977 | Baldwin et al. |
| 4,029,749 | A | * | 6/1977 | Murakami ............ 423/460 |
| 4,036,603 | A |  | 7/1977 | Bernet et al. |
| 4,052,170 | A |  | 10/1977 | Yan |
| 4,119,523 | A |  | 10/1978 | Baldwin et al. |
| 4,146,367 | A |  | 3/1979 | Hsu |
| 4,149,939 | A |  | 4/1979 | Solano |
| 4,156,595 | A |  | 5/1979 | Scott et al. |
| 4,213,826 | A |  | 7/1980 | Eddinger et al. |
| 4,234,386 | A |  | 11/1980 | Stirling |
| 4,263,124 | A |  | 4/1981 | Wickstrom et al. |
| 4,322,222 | A |  | 3/1982 | Sass |
| 4,341,598 | A |  | 7/1982 | Green |
| 4,395,309 | A |  | 7/1983 | Esztergar |
| 4,411,766 | A |  | 10/1983 | Garg et al. |
| 4,411,767 | A |  | 10/1983 | Garg |
| 4,466,362 | A |  | 8/1984 | Maxwell et al. |
| 4,534,847 | A |  | 8/1985 | Roberts et al. |
| 4,605,790 | A |  | 8/1986 | Wojtkowski |
| 4,678,478 | A |  | 7/1987 | Kelland |
| 4,834,650 | A |  | 5/1989 | Docherty et al. |
| 5,017,283 | A |  | 5/1991 | Oder |
| 5,087,269 | A |  | 2/1992 | Cha et al. |
| 5,114,700 | A |  | 5/1992 | Meihack et al. |
| 5,127,586 | A |  | 7/1992 | Oder |
| 5,151,159 | A | * | 9/1992 | Wolfe et al. ............ 202/118 |
| 5,171,406 | A |  | 12/1992 | Shang et al. |
| 5,176,260 | A |  | 1/1993 | Oder |
| 5,240,592 | A |  | 8/1993 | Meyer et al. |
| 5,326,457 | A |  | 7/1994 | Stipanovich, Jr. |
| 5,372,497 | A |  | 12/1994 | Coolidge et al. |
| 5,373,648 | A |  | 12/1994 | Wolf |
| 5,401,364 | A |  | 3/1995 | Rinker |
| 5,496,465 | A |  | 3/1996 | Fraas |
| 5,547,549 | A |  | 8/1996 | Fraas |
| 5,601,692 | A |  | 2/1997 | Rinker et al. |
| 5,711,769 | A |  | 1/1998 | Rinker et al. |
| 5,730,069 | A |  | 3/1998 | Coolidge et al. |
| 5,997,289 | A |  | 12/1999 | Dover |
| 8,470,134 | B2 |  | 6/2013 | Rinker |
| 2003/0118962 | A1 |  | 6/2003 | Munzner et al. |
| 2004/0065307 | A1 |  | 4/2004 | Fiveland et al. |
| 2007/0272538 | A1 |  | 11/2007 | Satchell |
| 2008/0116052 | A1 | * | 5/2008 | Eatough et al. ............ 201/6 |
| 2009/0119981 | A1 |  | 5/2009 | Drozd et al. |
| 2010/0281768 | A1 | * | 11/2010 | Walty ............... 44/599 |
| 2011/0011719 | A1 |  | 1/2011 | Rinker |
| 2011/0011720 | A1 |  | 1/2011 | Rinker |

OTHER PUBLICATIONS

Written Opinion of the International Searching Authority, Application No. PCT/US2012/039598, Dated Dec. 28, 2012.
Berkowitz N., An Introduction to Coal Technology, 1994, 2nd Edition, pp. 102-103; 164-165.
Dadayburjor, et al., Coal Conversion Processes Liquefaction, Kirk-Othmer Encyclopedia of Chemical Technology, 2003, vol. 6, pp. 851-856.
Kreith, F., Principles of Heat Transfer, 2nd Ed. 1965, pp. 236-238.
Mahajan O. et al., Low-temperature air oxidation of caking coals. 1. Effect on subsequent reactivity of chars produced, FUEL, 1980, vol. 59, January pp. 3-10.
Oder, R., Dry magnetic Separation of Ash, Sulfur, and Mercury From a Southwestern Wyoming Coal, presented at the 18th International Low Rank Fuels Symposium, Jun. 24-26, 2003, Billings, Mt, pp. 1-6.
The International Search Report and the Written Opinion, PCT/US2010/041918, dated Feb. 24, 2011.
International Search Report and Written Opinion, Application No. PCT/US11/51927, Dated Mar. 27, 2012.

\* cited by examiner

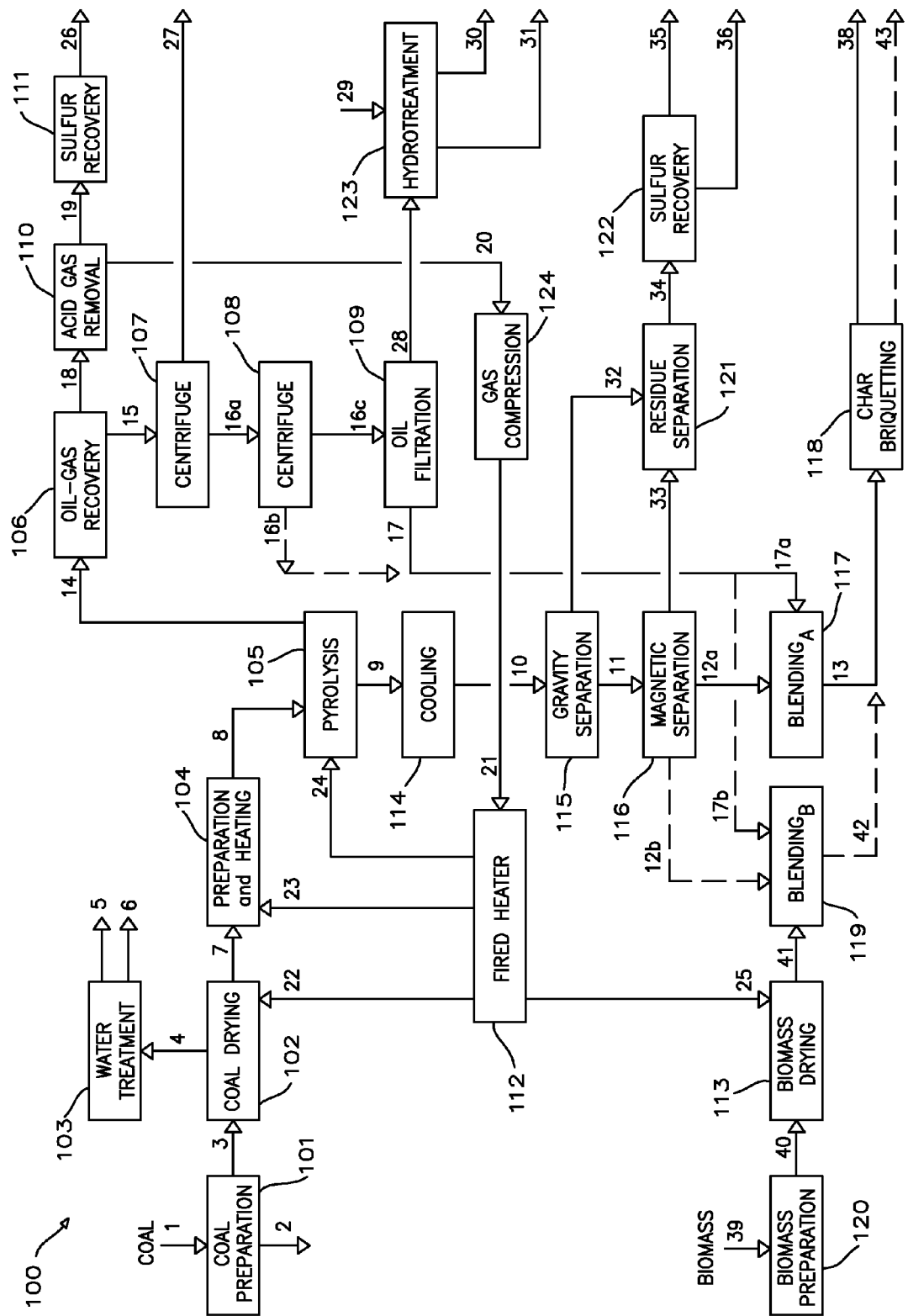

COAL PROCESSING WITH ADDED BIOMASS AND VOLATILE CONTROL

RELATED APPLICATIONS

This application claims priority from U.S. Provisional Patent Application Ser. No. 61/383,552, filed Sep. 16, 2010, and entitled COAL PROCESSING WITH ADDED BIOMASS AND VOLATILE CONTROL, which application is hereby incorporated in its entirety.

This application is related to pending U.S. patent application Ser. No. 12/556,935 filed Sep. 10, 2009, and entitled Process for Treating Coal by Removing Volatile Components, which is entitled to priority from Application Ser. No. 61/225,406 filed Jul. 14, 2009, entitled Process for Treating Coal by Removing Volatile Components.

This application is also related to pending U.S. patent application Ser. No. 12/556,977 filed Sep. 10, 2009, and entitled Process for Treating Agglomerating Coal by Removing Volatile Components, which is entitled to priority from Application Ser. No. 61/225,406.

This application is also related to pending U.S. patent application Ser. No. 12/557,041 filed Sep. 10, 2009, and entitled Process for Treating Bituminous Coal by Removing Volatile Components, which is entitled to priority from Application Ser. No. 61/225,406.

The disclosures of all of the above patent applications are incorporated herein by reference in their entirety.

TECHNICAL FIELD

The present invention relates to the field of coal processing, and more specifically to a process for treating coal to improve it heating quality and to remove certain undesirable constituents.

BACKGROUND OF THE INVENTION

Coal is used extensively throughout the United States and the rest of the world in the generation of process of heat and electricity for various industrial applications. At the same time, the burning of coal sometimes produces gas emissions such as carbon dioxide ($CO_2$), methane ($CH_4$), nitrogen oxides ($NO_x$), nitrous oxide ($N_2O$), carbon monoxide ($CO$), and sulfur dioxide ($SO_2$).

With the passage of the Environmental Protection Agency's Clean Air Interstate Rule requiring a nearly 60% cut in United States $SO_2$ emissions by 2015, many utilities with a capacity of 500 megawatts (MW) or more have since added $SO_2$ scrubbers to their coal power plants. Further, these 500 MW and above pulverized coal power producers also expect to add biomass injectors to their boilers to satisfy the green energy movement.

An improved process for the treatment of coal for use with added biomass and a lower sulfur content is desirable.

SUMMARY OF THE INVENTION

In a first aspect, there is provided a process for treating input coal, wherein the coal is treated in a pyrolysis step to form coal char. The pyrolysis step includes heating the coal substantially in the absence of oxygen to remove volatile material from the coal. The volatile material evolved from the coal in the pyrolysis step is treated to separate the volatile material into gases and liquids, wherein the liquids contain condensed volatile material. A portion of the liquids is directed to the coal char, and the returned portion of the liquids is mixed with the coal char, thereby returning some of the volatile material to the coal char.

According to this invention there is also provided a process for treating input coal, including treating the coal in a pyrolysis step to form coal char, where the pyrolysis step includes heating the coal substantially in the absence of oxygen to remove volatile material from the coal. Biomass material is mixed with the coal char, where the biomass material has a high volatile content. The addition of the biomass material to the coal char increases the volatile content of the coal char to provide an enhanced coal product.

According to this invention there is also provided a process for treating input coal, including treating the coal in a pyrolysis step to form coal char, where the pyrolysis step includes heating the coal substantially in the absence of oxygen to remove volatile material from the coal. The volatile material evolved from the coal in the pyrolysis step is treated to separate the volatile material into gases and liquids, wherein the liquids contain condensed volatile material. A portion of the liquids is directed to the coal char, and the returned portion of the liquids is mixed with the coal char, thereby returning some of the volatile material to the coal char. Biomass material is mixed with the coal char.

Various advantages of this invention will become apparent to those skilled in the art from the following detailed description of the preferred embodiment, when read in light of the accompanying drawings.

BRIEF DESCRIPTION OF THE DRAWINGS

FIG. 1 is a schematic illustration of a process for treating coal to form coal derived liquids and to form upgraded coal for manufacturing and heating uses.

DETAILED DESCRIPTION OF THE INVENTION

The disclosure illustrates a process in which coal is treated in a manner that enables undesirable constituents to be removed from the coal, and enables biomass to be added to the coal. Biomass fuel sources have many beneficial characteristics, including reducing greenhouse gas emissions and other pollutants, and improving combustion due to relatively high volatile content of biomass fuels. Further, certain constituents in input coal, such as mercury and sulfur, can be removed from the coal while still maintaining suitable levels of volatile material in the coal for processing in a power generation application. Also, the process generates synthetic crude oil suitable for refining into transportation fuels.

In general, the process includes drying, heating and pyrolyzing coal to separate volatile component from the input coal. The volatilized effluent material is treated to remove coal derived liquids, such as oils and tars. Further, the volatiles are treated to remove certain undesirable components, such as sulfur, mercury and ash.

Oil filtration sludge and coal tar removed from the coal during processing are later combined with the coal char. In one embodiment the combination includes 1.) coal char, 2.) oil sludge containing micron size char fines, and 3.) coal tar removed from the product oil. In another embodiment the combination includes biomass in addition to the oil sludge, coal tar and coal char. The sum of the various process steps included in this disclosure is to produce certain composite solid fuels. In one embodiment there is no added biomass, whereas in another embodiment biomass is added. In yet another embodiment volatile material from the pyrolyzing process is returned to the coal char. The resulting coal char produced from these various combinations can be used in existing coal fired power boilers. The resulting coal char has a reduced level of sulfur, mercury and ash. With the volatile content replenished, the product can meet the need for lower undesirable emissions from combustion of the char, and can meet the need for minimum volatile content to satisfy boiler combustion safety requirements.

In one embodiment the process includes filtering the coal derived oil to separate from the oil a sludge containing char fines and coal tars, and adding this sludge to the mixture of char and biomass to blend it in before producing solid fuel briquettes. Therefore, the pyrolysis step can be controlled to remove a maximum amount of the desirable raw oil for further treatment to form transportation grade oil feedstock or synthetic crude. Even though a substantial portion of the volatiles are removed from the coal during the pyrolysis step, a portion of those volatiles are reintroduced back into the coal by the transfer or infusion of the less desirable oil sludge and heavy coal tars into the coal char. This allows the ultimate resulting char product to achieve a volatile content consistent with the product needs of coal for power generation plants. The addition of the biomass also boosts the volatile content of the ultimate char product.

The advantage of the addition of biomass to coal for use in power generation boilers is that it can create a sustainable approach for power generation without undesirable carbon emissions. Most forms of useful biomass have very low amounts of sulfur and mercury and very high volatile content. The combination of these solid fuel options (i.e., pyrolyzed coal, oil sludge and heavy coal tars, and biomass) results in reduced power plant emissions while maintaining certain of the other desirable properties including a high level of volatiles, and a high thermal value of the coal char product.

A further potential benefit when producing the high volatile, high thermal value bituminous coal char is derived from treatment of the volatiles stripped from the coal during the pyrolysis step to form coal derived liquids and to refine the coal liquids into transportation grade fuels. It has been demonstrated that certain thermal processing steps including drying and pyrolysis will enable removal of organic sulfur and mercury from the parent or input coal in the form of vapors. These vapors may be water when the coal is heated to temperatures of 500° F. (260° C.) or less, and hydrocarbon vapors when the coal is heated to temperatures up to about 1300° F. (704° C.). The mercury vapors normally leave the coal with the water vapors during the coal drying step. Most of the organic sulfur leaves the input coal during the pyrolysis step as carbon disulfide or hydrogen sulfide. These gases join with hydrocarbon vapors also leaving the coal upon being heated.

It can be seen that in general the process includes thermally treating the high volatile, high thermal value bituminous coal to remove the undesirable organic sulfur and mercury components, and forming both coal char and coal derived raw oil. Thermal processing is facilitated by the use of fluidized bed heating units. Any suitable equipment can be used, such as heat exchangers manufactured by Carrier Vibrating Equipment, Louisville, Ky. In the process, the coal is to be crushed to facilitate the thermal processing in fluidized bed heating units. The incoming input coal can be crushed to minus 10 mesh or less to enable this type of thermal process to proceed. In some cases the coal will be crushed to minus 60 mesh or more to facilitate separation of inorganic sulfur and ash as is discussed in U.S. patent application Ser. No. 12/557,041, referred to above.

The need for diminution or crushing is an essential part of the preparation of the coal for drying, heating, pyrolysis, and cooling steps. Cage mills are typically used for crushing coal particles. Any suitable apparatus can be used. One source for suitable cage mill coal crushing equipment is Stedman Foundry and Machine Works, Aurora, Ind., USA. Eventually the crushed particles become refined coal char particles which need to be consolidated to form shippable briquettes. This consolidation step, coming after the crushed char particles are cooled and treated to remove some of the inorganic sulfur and coal ash, affords the opportunity to add the sludge from filtering of the coal derived oil and to add crushed biomass to form a high volatile solid fuel having lower undesirable components. The sludge from filtering the coal derived oil contains micron size char particles and heavy coal tar like oil which is important in forming a binder to enable the briquetting process to take place.

Referring now to FIG. 1, the overall coal treating process is shown schematically at 100. A stream of input coal indicated at 1 is introduced into the system, and is processed at step 101 by crushing the coal to the appropriate size and by washing the coal. Typically surface mined coals are sized to minus 50 millimeter, although other sizes can be used. The coal is washed to separate a portion of the clay, ash and inorganic sulfur commonly known as pyrite. Some coal particles are attached to the discard stream 2 along with the pyrite particles and the coal ash. A seam number 11 bituminous coal from the Illinois Basin in Midwestern USA may contain 12% clay and ash in addition to 4% inorganic sulfur as received from the mine. After washing the ash is typically about 8% and the inorganic sulfur is typically about 2%. The steam 3 of washed coal will be crushed and screened to minus 2 millimeter or finer as required to achieve the downstream removal of additional ash and pyrite, and suitability for fluidized bed thermal processing.

The stream 3 of washed and crushed coal typically contains about 10 to 12% moisture, although it could be higher or lower. The drying step 102 is optionally carried out at temperature levels below about 500° F. (260° C.) so as not to liberate desirable hydrocarbons slated for downstream removal in other steps of the coal processing. This avoids contamination of the liberated coal moisture with hydrocarbon compounds. In one embodiment, the mercury in the incoming coal was reduced by 72%. The drying effluent 4 is composed of water vapor, micron size coal particles and trace amounts of mercury. This is directed to a water treatment system indicated at 103.

In the water treatment system 103 water vapor from the drying process is treated to remove micron size coal particulates, and then the water vapor is condensed. The coal particulates are removed via stream 5 and are returned to the coal being processed. The condensate stream is treated to remove the mercury compounds, shown as being drawn off at 6.

The stream 7 of dried coal particles exiting the dryer 102 is conveyed to a coal preparation and preheating step, indicated at 104. Bituminous coals having a swelling index (FSI) of 4 or more need to be treated with oxygen at temperature levels between 450° F. (232° C.) and 550° F. (288° C.) to cause chemisorption of carbon-oxygen compounds on the surface of the dry coal particles. This oxidized coating on the surface of the coal particles defeats the swelling or sticky properties of agglomerating coal prior to the point at which the coal is heated to higher temperatures in downstream thermal heating apparatus. In certain thermal treatment processes, the coal particles are heated further or preheated, stopping at the temperature no greater than the temperature of incipient release of the desirable C5+ condensable hydrocarbons, typically about 800° F. (427° C.). It is desirable to delay the release of such hydrocarbons until the coal reaches the downstream thermal processing step in the pyrolyzer 105. The pyrolyzer 105 is connected via line 14 to an oil and gas recovery exhaust system 106.

The preheated and chemisorbed coal particles in steam 8 are transferred from the thermal preparation step 104 to the pyrolysis step 105. Various compounds are released as vapors in the pyrolysis unit including some or all of CO, $CO_2$, $H_2$, $CH_4$, $C_2H_6$, $C_3H_8$, $C_4H_{10}$, $H_2O$, $NH_3$, COS, $H_2S$ and condensable C5+ hydrocarbons. The thermal treatment at temperatures from 800° F. (427° C.) to 1300° F. (704° C.) causes organic sulfur to be released and carried away from the coal char by the sweep gas used in the pyrolysis process. The combined effluent stream containing the sweep gas and the vapors is shown as stream 14. In a one embodiment, the organic sulfur is reduced from 1.5% to 0.5% in the resultant coal char stream 9 exiting the pyrolyzer 105.

The gases and vapors leaving the pyrolysis unit 105 via stream 14 are transported with recycled sweep gas into the oil recovery system 106. The oil recovery system has a combination of absorbers, coolers and electrostatic precipitators to condense and separate the desirable raw coal derived oil, at this point containing micron size char particles. The condensed oil typically has a wide range of boiling points from as low as 300° F. (149° C.) to well over 1000° F. (538° C.). The higher boiling point liquids are coal tars having excellent binder properties useful in the downstream briquetting process. The sweep gases and vapors from the pyrolysis unit 105 convey particulate char particles away from the main coal char stream 9. Char particulates of about 5 micron size or more are removed from the effluent stream 14 in a cyclone type gas-solids separator, not shown, and returned to the main coal char stream 9.

Some of the char particulates of 5 micron size or less, including submicron sizes, in effluent stream 14 are transported with the sweep gas and collected with coal derived oil condensate. These coal char particles must be removed from the raw oil to facilitate downstream hydrotreating. It is also desirable to remove some of the high boiling point "coal tar" liquids. Certain components released from the coal in the pyrolysis process are non condensable including $H_2$, $CH_4$, CO, $CO_2$, $NH_3$, $H_2S$, COS, and other hydrocarbons. These gaseous components are separated from the oil in oil-gas recovery step 106 as stream 18. Of particular interest are the gaseous sulfur compounds because it is desirable to separate such compounds. An additional feature of the oil-gas recovery step 106 is that some water vapor from the pyrolysis process is condensed and drawn off with the oil condensate as stream 15.

A centrifuge 107 is used to separate the pyrolysis water from the coal derived oil. In a typical pyrolysis of bituminous coal example, the pyrolysis water was determined to make up 31.2 lbs. (14.14 kg.) from a ton (2000 lbs. (908 kg.)) of dry coal or about 1.5%. A portion of the coal derived oil leaves the centrifuge 107 as stream 16a, and a portion leaves the centrifuge 107 as pyrolysis water as indicated at stream 27.

A second centrifuge 108 is used to remove heavy hydrocarbon liquid (Coal Tar) from the coal derived oil stream 16a. The coal tar is removed via stream 16b.

The condensate collected from the water and coal tar removal centrifuges is piped as stream 16c to an oil filtration system shown at 109. This stream 16c contains light and heavy coal derived coal liquids and some sludge including micron size char solids and some coal tar. The fine coal char particulates and any other fine solids found in the oil are known by experts in the field as quinoline insolubles (QI's). For unfiltered pyrolysis oils made from bituminous coals, QI's ranged from 4.62 to 8.64 weight percent, although they can be higher or lower. It is optimal that the QI's be removed from any stream of oil to be recovered for transportation fuels because the downstream hydrotreating process requires that the QI's be less than about 0.1 weight percent. Pressurized rotary drum pre-coat filters can be used in the oil filtration step 109 to successfully perform the filtration and achieve the required filtration efficiency. The Goslin-Birmingham Corporation is a manufacturer of rotary drum pre-coat filters suitable for removing micron and submicron size coal char particles to produce an oil filtrate containing approximately 0.1 weight percent solids. Other filtration equipment can also be used. Some heavy oil is carried over with the solids. For a given unfiltered oil sample of note containing 5.43% solids ranging from 1 to 30 microns in size, the filtrate contained less than 0.1% solids. The sludge contained about 30 weight percent oil. The recovered oil is drawn off via stream 28. The recovered oil 28 amounted to 96% of the oil in the unfiltered oil stream 16c. The remaining sludge becomes stream 17, which is supplemented by coal tar stream 16b. In this embodiment, the sludge containing the coal tar (stream 17) is to be added to the coal char to produce the coal briquettes, as will be further explained below. The desirable filtered oil in stream 28 contains less than about 0.10 weight percent quinoline insolubles and has the pyrolysis water and some of the high boiling point coal derived oil coal tar removed. Therefore it can be seen that the coal fines and coal char particulates are removed from the oil prior to hydrotreatment in the hydrotreatment step 123, and added to the coal char product in blenders 117 or 119, as will be explained below.

The oil sludge in stream 17, which includes the coal tar in stream 16b, is used as a binder for the briquetting of the char fines. The effect of using this coal tar stream 16b and sludge steam 17 is to add back to the coal char a portion of the volatile material removed during the pyrolysis step. It is anticipated that about 15% of the coal derived oil will be separated in the form of coal tar, although the amount could be higher or lower. When added back into the volatile depleted char, it will increase the volatile content in the char typically be an amount within the range of from about 2% to about 15%. In one embodiment it is expected to increase the volatile content by about 4.5%. For example, it may increase the volatile content of the char from an initial level or content of about 12 weight percent of the char to an enhanced level of about 16.5 weight percent of the char. In other embodiments the volatile content is increased by a larger amount.

As noted above, the gaseous components separated from the oil in the oil-gas recovery step 106 is indicated at 18. The gas in this stream is generally a non-condensable gas containing certain gaseous sulfur compounds. Steam 18 is directed to an acid gas removal unit 110. In the process step 110, typically the COS is converted to $H_2S$ in the presence of hydrogen in the off gas stream. The $H_2S$ is removed from the gas stream in absorber towers in the gas removal step 110. An alternative is to leave the $H_2S$ in the gas stream for combustion to $SO_2$, requiring a different type of scrubbing process for removal. Use of absorbers to remove the acidic $H_2S$ is preferred as the sulfur can be extracted in a downstream sulfur recovery unit 111. Several mature technologies exist for the removal of the acid gas compounds and the production of elemental sulfur. The LO-Cat® process is a wet scrubbing liquid redox system that uses a chelated iron solution to absorb the $H_2S$, rendering the cleaned gas 20 essentially sulfur free.

The liquor stream 19 from the acid gas removal absorbers in step 110 is transferred to a sulfur recovery step 111. The sulfur is extracted from chelated iron solution, which is recycled back to the absorption apparatus. Other sulfur removal processes can be used. The elemental sulfur stream 26 becomes a valuable by-product.

With the sulfur compounds removed, the gas in stream 20 contains important fuel components. A typical gas stream will have a heating value of at least about 250 Btu per standard cubic foot, and in one embodiment a heating value within the range of from about 250 to about 500 Btu per standard cubic foot. The gas in stream 20 can be compressed in any suitable manner, such as with a compressor 124. The compressed fuel gas stream 21 is piped to a boiler or fired heater 112, where the gas is combusted to form useful process heat.

The fired heater 112 receives the gaseous process fuel in stream 21 for combustion. The fired heater 112 has tubular heat exchange surfaces for producing superheated steam and/or heating gases for use in the drying of the coal, indicated at stream 22. Selas Fluid Processing Corporation of Blue Bell, Pa. is a designer and supplier of fired heaters. Other configurations can be used. The steam and heated gases generated in the fired heater 112 are directed out as several process streams. Stream 22 is a steam flow used in the dryer 102. Stream 23 is a stream of hot gases used in the preparation and preheating of the coal in step 104. Stream 24 is a flow of steam for use in the pyrolyzer 105. Stream 25 is a stream of hot gases used for drying biomass in the biomass dryer 113.

The hot char leaving the pyrolysis unit (stream 9) is conveyed into a cooling unit 114 where the char is cooled from the high temperatures experienced in the pyrolyzer 105. In one embodiment the maximum temperature of the coal in the pyrolyzer reaches no higher than about 1300° F. (704° C.), and typically the temperature of the char in stream 9 is less than about 1100° F. (593° C.). The char is cooled in the cooler 114 to temperatures less than about 300° F. (149° C.), and typically about 250° F. (121° C.). The removal of heat energy from the char in the cooler 114 is carried out using indirect heat exchangers. Other cooling means can be used. The removed or recovered heat, using recycled inert gas other heat transfer medium, can be used elsewhere in the process. The cooled char leaves the cooler 114 as stream 10.

The cooled char in stream 10 is conveyed to an ash gravity separation apparatus 115 where ash particles, shown in stream 32 are removed from the main char stream (stream 11).

From the gravity separation apparatus 115 the main char stream 11 can optionally be conveyed to a paramagnetic separation apparatus 116 where inorganic sulfur particles having paramagnetic properties are removed from the main stream 11. This is further explained in pending U.S. patent application Ser. No. 12/556,977 referred to above.

Following the gravity and magnetic separation steps, the cooled and cleansed char stream 12a is conveyed to the mixing and blending apparatus 117 where the coal is mixed with the sludge and coal tar from stream 17a, which is one of the branches of stream 17. The blend of coal, sludge and coal tar exits blender 117 as exit stream 13, and this stream contains no biomass. The mixture 13 is directed to the briquetting apparatus 118 where the mixture of coal, sludge and coal tar is briquetted to form a steam 38 of shippable, water resistant, compact coal char briquettes having improved heat value over that of the initially received input coal stream 1.

Coal briquetting is well known and involves the forming of small particles of coal into solid lumps by pressure. A leading manufacture of compacting and briquetting machines is K.R. Komerek Corporation, Wood Dale, Ill. Typically a binder is added to the coal or coal char fines as a precursor to briquetting in a roll press briquetting machine. Binders for briquetting are divided by their function into matrix type binders, film type binders and chemical binders. Coal tar and petroleum asphalt are film type binders. For the pressure formation of coal tar briquettes in a roll press type briquetting machine, the addition of about 3 to about 5 weight percent coal tar is advantageous. The temperature of the char being briquetted is also an important factor. For this embodiment temperatures between about 200° F. (93° C.) and about 300° F. (149° C.) will be used, with a temperature of about 250° F. (121° C.) being a target temperature.

Alternatively, biomass can be added before the briquetting step. A cooled and cleansed char stream 12b is conveyed from the magnetic separator 116 to an alternate mixing and blending apparatus 119 where the coal is mixed with the sludge and coal tar from stream 17b, which is one of the branches of stream 17. A biomass supply stream is indicated at 39. Typically the biomass enters the process containing significant moisture, typically as saw dust briquettes or some form of compacts. The moisture needs to be removed and the compacts crushed to render the biomass suitable for blending with the coal char.

The stream of biomass 39 is conveyed to the biomass preparation step 120, where the biomass can be prepared for use in the overall process. Examples of procedures in the biomass preparation step 120 include sizing the biomass particles, blending the biomass to improve the homogeneity of the biomass particles, and heating the biomass. The prepared biomass flows via stream 40 to the biomass dryer 113. After drying, the biomass is introduced via stream 41 into the alternate blender 119, where the biomass is blended with the coal, sludge and coal tar.

The blend of biomass, coal, sludge and coal tar exits the alternate blender 119 as exit stream 42, and this stream is directed to the briquetting apparatus 118 to form a steam 43 of briquetted coal char with biomass, having improved heat value over that of the initially received coal stream 1.

In certain embodiments the biomass has a volatile content of at least 50%. In other embodiments the biomass has a volatile content of at least 75%.

When added to the coal, the biomass can increase the volatile content in the char by an amount within the range of from about 2% to about 15%. In one embodiment it is expected to increase the volatile content by about 4.5%. For example, it may increase the volatile content of the char from an initial level or content of about 12 weight percent of the char to an enhanced level of about 16.5 weight percent of the char. In other embodiments the volatile content is increased by a larger amount. In some embodiments the briquetted coal char with biomass in stream 43 has a total volatile content of at least about 15%. In certain embodiments, the biomass and coal are combined in a ratio within the range of from about 1:7 to about 1:3. In one embodiment the biomass and coal are combined in a ratio of about 1:5 by weight.

As disclosed above with respect to the cooled char in the gravity separation step 115, a flow 32 of ash and inorganic sulfur particles from the separator 115 is formed. This flow is introduced into the residue separator 121. Also, the magnetic separator 116 creates a stream 33 of inorganic sulfur particles having paramagnetic properties, and steam 33 is also introduced into the residue separator 121. In the residue separator 121 the material is mechanically treated by pulverizing to reduce the size of particles. The treated particles (stream 34) are conveyed to a gravity separation unit 122, where coal ash and inorganic sulfur particles are separated using air-gravity techniques to divide the discard (stream 34) into a predominately sulfur stream 35 and a predominately coal ash stream 36. The sulfur stream 35 is a valuable product stream.

The raw coal derived oil in stream 28 from the oil filtration step 109 can be processed in a hydrotreating unit 123 to prepare the product for refinement into transportation grade fuels. By the time the oil in stream 28 leaves the filtration step 109, it has already been centrifuged to remove pyrolysis water and certain heavy hydrocarbons, e.g. coal tar, and filtered to remove quinoline insolubles. Typically, the raw oil 28 will have a degrees API value of about 5 or less, often having a minus value. Degrees API is a measure developed by the American Petroleum Institute (API) for oil or crude indicating the specific gravity of the liquid. A sample of coal derived oil produced using the above described process exhibited a degrees API value of 4.0. Oil refineries prefer crude oil having certain characteristics. Among the desirable characteristics is a degrees API value in the order of 25, a density of 7.5 lbs./gallon (0.90 kg/liter) and a hydrogen content in excess of 12 weight percent. The raw oil with a degrees API value of 4 will have a density of 8.5 lbs/gallon and a hydrogen content of about 5 weight percent. Further, undesirable oxygen, nitrogen and sulfur must be reduced to the extent possible. In order to render the raw coal derived oil salable therefore, the oil must be treated with hydrogen at high pressure and temperature. A hydrogen stream 29 is added to the raw oil in the hydrotreatment step 123, producing a synthetic crude stream 30 and discard stream 31. Typically the gaseous stream 31 will contain NH3, H2S and H2O. The gas stream 31 should be treated before it is released to the atmosphere to remove the sulfur and nitrogen.

EXAMPLE I

Input coal was processed according to the coal treating process 100. After pyrolysis the coal tar from stream 16b and sludge from stream 17 were added back to the char and blended in a blender 117. The resulting blend of components was analyzed and the results are shown in Table I. It can be seen that the tar and sludge added to the char raised the volatile content from 12.9% to 17.0%, an increase of 4.1%.

TABLE I

| | | Stream No. | | | |
|---|---|---|---|---|---|
| | Components | 12 Char | 16a Tar | 17 Sludge | 13 Blend |
| Weight Summary | C | 1028.2 | 63.1 | 49.2 | 1140.5 |
| | H | 35.3 | 4.2 | 1.7 | 41.2 |
| | N | 27.7 | 1.1 | 1.3 | 30.1 |
| | S (inorganic) | 17.1 | | | 17.1 |
| | S (organic) | 3.5 | 1.1 | 1.4 | 6.0 |
| | O | 47.3 | 3.1 | 2.3 | 52.7 |
| | Ash | 145.9 | 0.4 | 8.1 | 154.4 |
| | Moisture | 0.0 | 0.0 | 0.0 | 0.0 |
| Weight Totals, lbs | | 1,305.0 | 73.0 | 64.0 | 1,442.0 |
| Volatile, % | | 12.9 | 78.0 | 30.9 | 17.0 |
| Fixed Carbon, % | | 75.9 | 22.0 | 56.4 | 72.3 |
| Sulfur, % | | 1.6 | 1.5 | 2.2 | 1.6 |
| Ash, % | | 11.2 | 0.5 | 12.7 | 10.7 |
| Yield, % | | 65.3 | 3.7 | 3.2 | 72.1 |
| Heating Value, BTU/lb | | 12,953 | 12,953 | 13,296 | 13,225 |
| Mercury, milligrams | | 24 | | | 24 |

EXAMPLE II

Input coal was processed according to the coal treating process 100. After pyrolysis the coal tar from stream 16b and sludge from stream 17 were added back to the char, along with a supply of biomass, and blended in a blender 119. The resulting blend of components was analyzed and the results are shown in Table II. It can be seen that the addition of the biomass, tar and sludge to the char raised the volatile content from 17.0% to 35.1%.

TABLE II

| | | Stream No. | | |
|---|---|---|---|---|
| | Components | 13 Char Blend | 42 Bio-Mass | 43 Composite |
| Weight Summary | C | 1140.5 | 276.0 | 1416.5 |
| | H | 41.2 | 33.6 | 74.8 |
| | N | 30.1 | 0.4 | 30.5 |
| | S (inorganic) | 17.1 | | 17.1 |
| | S (organic) | 6.0 | 0.2 | 6.2 |
| | O | 52.7 | 246.2 | 298.9 |
| | Ash | 154.4 | 1.6 | 156.0 |
| | Moisture | 0.0 | 0.0 | 0.0 |
| Weight Totals, lbs | | 1,442.0 | 558.0 | 2,000.0 |
| Volatile, % | | 17.0 | 82.0 | 35.1 |
| Fixed Carbon, % | | 72.3 | 17.7 | 57.2 |
| Sulfur, % | | 1.6 | 0.0 | 1.6 |
| Ash, % | | 10.7 | 0.2 | 7.7 |
| Yield, % | | 72.1 | 27.9 | 100.0 |
| Heating Value, BTU/lb | | 13,225 | 8,609 | 11,937 |
| Mercury, milligrams | | 24 | 0.0 | 24 |

The principle and mode of operation of this invention have been described in its preferred embodiments. However, it should be noted that this invention may be practiced otherwise than as specifically illustrated and described without departing from its scope.

What is claimed is:

1. A process for treating input coal, the process comprising:
    treating the coal in a pyrolysis step to form coal char, where the pyrolysis step includes heating the coal substantially in the absence of oxygen to remove volatile material from the coal;
    treating the volatile material evolved from the coal in the pyrolysis step to separate the volatile material into gases and liquids, wherein the liquids contain condensed volatile material;
    directing a portion of the liquids to the coal char, and mixing the returned portion of the liquids with the coal char, thereby returning some of the volatile material to the coal char; and
    mixing biomass material with the coal char.

2. The process of claim 1 where the biomass material has a volatile content, and where the addition of the biomass material to the coal char increases the volatile content of the coal char by an amount within the range of from about 2% to about 15%.

3. The process of claim 1 including briquetting the mixture of coal char and the biomass.

4. The process of claim 1 in which the volatile content of the biomass is at least about 50% of the biomass material.

5. The process of claim 1 in which the input coal contains sulfur compounds, and in which the step of treating the volatile material includes separating sulfur compounds from the volatile material so that the liquids contain little or no sulfur compounds, thereby enabling a removal of some or all of the sulfur compounds from the input coal even though some of the volatile material is returned to the coal char during the step of returning a portion of the liquids to the coal char.

6. The process of claim 1 in which the treatment of the volatile material separates the volatile material into gases and liquids, where the liquids include an oil sludge component and a coal tar component, and further including removing water and coal tar from the liquids to form an unfiltered oil stream, and further filtering the unfiltered oil stream to form a filtered synthetic crude oil stream suitable for refining into transportation fuels.

7. The process of claim 6 in which the filtered synthetic crude oil stream contains less than about 0.10 weight percent quinoline insolubles.

8. The process of claim 1 in which the weight ratio of biomass to coal char in the biomass-coal char mixture is from about 1:7 to about 1:3.

9. The process of claim 1 in which the volatile content of the biomass-coal char mixture is enhanced to a level in excess of about 12%.

10. The process of claim 1 in which the volatile content of the biomass-coal char mixture is enhanced to a level in excess of about 16%.

11. A process for improving the heat value of pyrolyzed coal char, the process comprising:
   blending pyrolyzed coal char, sludge and coal tar with dried biomass having a volatiles content of at least about 50% by weight; and
   forming the blend into briquettes.

12. The process of claim 11 in which the weight ratio of biomass to coal char in the biomass-coal char mixture is from about 1:7 to about 1:3.

13. The process of claim 11 in which the volatile content of the biomass-coal char mixture is enhanced to a level in excess of about 12%.

14. The process of claim 11 in which the volatile content of the biomass-coal char mixture is enhanced to a level in excess of about 16%.

15. The process of claim 11 in which the addition of the biomass material to the coal char increases the volatile content of the coal char by an amount within the range of from about 2% to about 15%.

16. A process for making an improved coal char mixture, the process comprising:
   pyrolyzing coal to form coal char, where the pyrolyzing step includes heating the coal substantially in the absence of oxygen to remove volatile material from the coal;
   separating the volatile material from the pyrolyzing step into a gas component and a liquid component, wherein the liquid component contains condensed volatile material;
   mixing the pyrolyzed coal char with (a) a portion of the liquid component containing condensed volatile material and (b) dried biomass material to form a coal char mixture having an enhanced volatile content.

17. The process of claim 16 in which the volatile content of the biomass material is at least about 50% of the biomass material.

18. The process of claim 16 in which the weight ratio of biomass material to coal char in the coal char mixture is from about 1:7 to about 1:3.

19. The process of claim 16 in which the volatile content of the coal char mixture is enhanced to a level in excess of about 12%.

\* \* \* \* \*